Fig. 3

A = on
E = off
T = free turbine
Kl = control flap

| Gear stage | diesel engine | K | B | Kl.11 T.I | Kl.12 T.II | Kl.13 T.III | B I | B II | B III | Kl.30 | F.I | F.II | gas generator G |
|---|---|---|---|---|---|---|---|---|---|---|---|---|---|
| Starting | E | A | A | A | A | A | A | A | A | E | E | E | E |
| Idling | E | A | A | A | A | A | A | A | A | A | E | E | E |
| Initial motion T | A | A | E | E | A | A | A | A | A | A | E | E | E |
| Initial motion M+T | E | E | A | E | A | A | E | A | A | A | E | E | E |
| Initial motion M | E | E | A | A | A | A | E | A | A | A | A | E | A |
| 1. Speed M | E | E | A | A | A | A | E | A | A | A | A | E | A |
| 2. Speed M | E | E | A | A | A | A | A | E | A | A | A | A | A |
| 3. Speed M | E | E | A | A | A | A | A | A | E | A | A | A | A |
| 1. Speed T | A | A | E | E | A | A | A | A | A | A | E | E | E |
| 2. Speed T | A | A | E | A | E | A | A | A | A | A | A | E | E |
| 3. Speed T | A | A | E | A | A | E | A | A | A | A | A | A | E |
| 1. Speed M+T | E | E | A | E | A | A | A | A | A | A | E | E | E |
| 2. Speed M+T | E | E | A | A | E | A | A | A | A | A | A | E | E |
| 3. Speed M+T | E | E | A | A | A | E | A | A | A | A | A | A | E |
| 1. Speed B III | A | A | A | E | A | A | A | A | E | A | E | E | E |
| 2. Speed B III | A | A | A | A | E | A | A | A | E | A | A | E | E |
| Reverse T III | A | A | A | A | A | E | E | A | A | A | A | A | E |
| Reverse T II | A | A | A | A | E | A | E | A | A | A | A | E | E |
| Reserve coasting | A | A | A | A | A | A | E | A | A | A | A | A | A |
| Downhill 1. Speed M | E | E | A | E | E | E | E | A | A | A | A | E | A |
| Downhill 2. Speed M | E | E | A | E | E | E | A | E | A | A | A | A | A |
| Downhill 3. Speed M | E | E | A | E | E | E | A | A | E | A | A | A | A |
| Downhill 3. Speed T | A | A | E | E | E | E | A | A | A | A | A | A | A |
| Downhill M+T | E | E | A | E | E | E | A | A | A | A | A | A | A |
| Parking Brake |  | A | E | A | A | A | E | A | A | A | A | A | A |

United States Patent Office 3,518,827
Patented July 7, 1970

3,518,827
DRIVE SYSTEM FOR VEHICLES
Fritz Riemerschmid, Starnberg, Germany, assignor to Motoren- und Turbinen-Union, Munich, Germany
Filed Oct. 10, 1968, Ser. No. 766,537
Claims priority, application Germany, Oct. 11, 1967, 1,630,820
Int. Cl. F01k *23/14;* F16h *37/06*
U.S. Cl. 60—11
8 Claims

ABSTRACT OF THE DISCLOSURE

A diesel engine and a plurality of gas turbine engines are coupled through a multi-gear stage planetary gear system. The turbine engines are driven by a gas generator and the output to the vehicle drive shaft has its gear ratio changed, that is, gears shifted, by routing the gas from the generator to the turbine engine connected to its gear stage.

---

This invention relates to a drive system for vehicles with two drive units, in which, as selected, one or the other or both drive units can be positively coupled to the wheel output shaft of the vehicle.

Experience has shown that, particularly in road traffic, heavy transport vehicles are not capable of maintaining high continuous speeds or of accelerating rapidly from standstill to the desired crusing speed. In most cases, the drive power unit of such vehicles, for example, of diesel engines, is insufficient.

To improve the required road performance of a vehicle equipped with a drive unit of relatively low output, it has been proposed to provide it with an additional power unit, for example, a gas turbine engine. In this case, the gas turbine engine output shaft is rigidly connected to the drive shaft of the vehicle via a reduction gear.

During driving, however, the drive wheels of a vehicle are subjected to considerable r.p.m. changes; therefore, a direct connection between the gas turbine engine and the drive wheels is not suitable, inasmuch as optimum utilization of the performance of a gas turbine engine is only possible if its free turbine can work in the r.p.m. range for which it has been designed.

In order to keep the r.p.m.'s of both drive units, during all driving conditions, as constant as possible, it is required to select the gears provided.

A change in the gear ratio and the gear shifting action association with it will cause, however, an interruption of the power flow and thus an r.p.m. reduction of the drive units, whereby, particularly, the efficiency of the additional gas turbine engine is considerably reduced.

For use in automotive drive units, it has also been proposed to replace the mechanical gearboxes by hydraulic torque converters.

A joint vehicle drive system consisting of a diesel engine and a gas turbine engine, with a torque converter arranged between the two drive units, is not suitable, since the performance of such a converter would have to be matched to that of the diesel engine, so that the latter could not cope with the performance increase taking place as soon as the gas turbine engine is started.

The object of this invention is to supplement the performance of a first drive unit, for example, a diesel engine, by the power of a second drive unit, preferably a gas turbine engine, for a vehicle in such a manner that, during all practical driving conditions, an optimum road performance of the vehicle can be achieved, whereby, in particular, a high efficiency of both drive units is to be accomplished by means of an almost infinitely variable speed control of the vehicle output shaft.

In general, this object is obtained mainly by arranging one or more free turbines in a known manner downstream of one of the drive units, for example, a gas generator, the exhaust gases of which are driving said free turbines, which in turn are in engagement with the associated gear of a single- or multiple-speed planetary gear unit which, via a clutch, can be connected, upon selection, with the output shaft of the other drive unit, for example, of a diesel engine, so that, during joint drive of the vehicle by means of the gas generator and the diesel engine or by the gas generator alone, gear shifting is effected by routing the gas stream of the gas generator to a free turbine engaged with the respective gear of the planetary gear system.

Due to the use of several free turbines, it will be possible, in addition to an almost infinitely variable control of the output shaft speed, to achieve a power flow from the diesel engine which is almost completely unaffected by the shifting action and to utilize, depending on the design of the gear stages, a relatively high percentage of the energy supplied by the gas generator at all speeds by merely routing the gas stream to the free turbine associated with the respective gear.

In a further embodiment of the invention, the gear shafts which are used for transmitting the driving power of the gas generator from the associated free turbines to the various stages of the planetary gear unit, as well as all sun gears of the planetary gear system can be braked, whereby, preferably, the gear shafts associated with those stages of the planetary gear system which have a higher reduction ratio are provided with overrunning free wheel clutches in order to separate the connection between the gear shafts and one or more of those free turbines which are not used for transmitting the power of the gas generator.

If, for instance, the vehicle is operated solely by means of the diesel engine, the brake of that gear shaft can be applied, the associated planetary gear reduction stage of which is selected for driving, while overrunning clutches on those gear shafts which are engaged with the remaining reduction stages of the planetary gear system, disengage the gear shafts together with their associated free turbines.

The means by which the objects of this invention are obtained are described more fully with reference to the accompanying drawings which apply to the operation of a vehicle on its lowest reduction ratio, which is the third gear in this case.

FIG. 3 is a table showing the functions of the various components of the drive system during various operating conditions of the vehicle;

Figure 1:
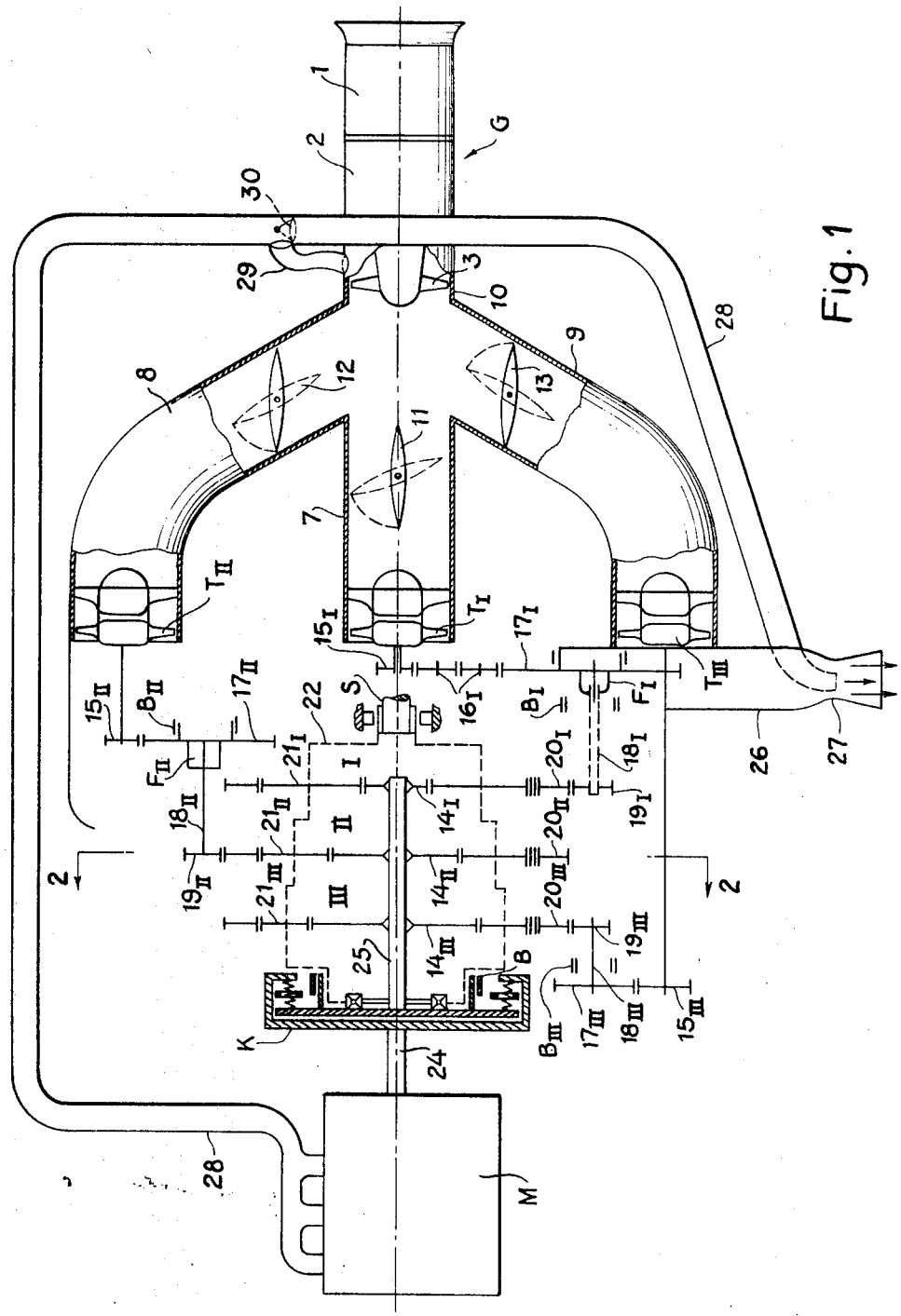
FIG. 1 is a plan view of a drive system according to this invention.
Figure 2:
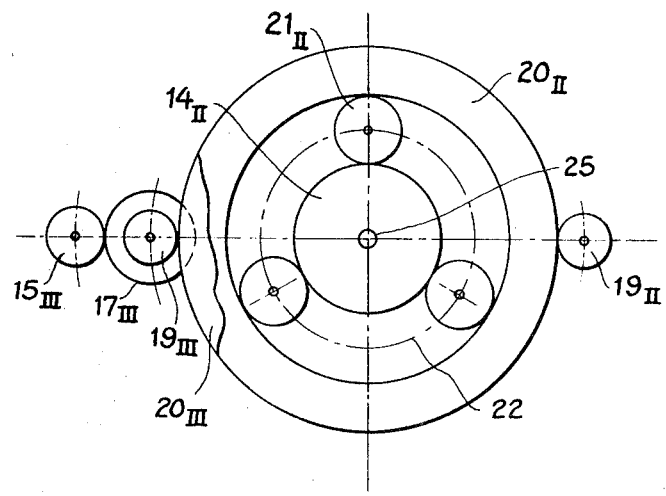
FIG. 2 is a cross-sectional view taken on the line 2—2 in FIG. 1.

The gas generator G in FIG. 1, provided for driving the vehicle, consists, in a known manner, of a compressor section 1, a combustion section 2, and turbine 3 arranged downstream of it. Compressor and turbine may have axial or radial blading which are known per se. Downstream of turbine 3, three free turbines $T_I$, $T_{II}$ $T_{III}$ are arranged which can be supplied, upon selection, with the gas generator exhaust gases routed through feed pipes 7, 8, 9, their gas inlet ports branching off from exhaust duct 10 of the gas generator. Inside of feed pipes 7, 8, 9 control flaps 11, 12 and 13 are arranged, their open position in feed pipes 8, 9 being shown by broken lines, while, in pipe 7, the closed position is shown in broken lines.

The following describes the initial movement of a vehicle in the first gear with the aid of the gas generator:

Control flap 11 in feed pipe 7 is opened and, with the gas stream thus routed to free turbine $T_I$, all sun gears $14_I$, $14_{II}$, $14_{III}$ of the planetary gear system are braked by means of brake B. Free turbine $T_I$ transmits its energy via gears $15_I$, $16_I$, $17_I$, and the automatically blocked overrunning clutch $F_I$ to gear shaft $18_I$, the associated pinion $19_I$ of which is engaged with the annulus gear with internal and external teeth $20_I$ of the first stage of the planetary gear system. From there the turbine is transmitted to planet gear carrier 22, due to the blocked sun gears $14_I$, $14_{II}$, $14_{III}$ by means of planet pinion $21_I$ of the first stage, and from planet gear carrier 22 to output shaft S of the vehicle. During this process, diesel engine M may be either at standstill or at idling after it has been disengaged by means of clutch K.

During driving with free turbine $T_I$ in the first speed of the planetary gear, free turbines $T_{II}$, $T_{III}$ are following with negative r.p.m.'s, which, however, does not lead to any sizable losses during practical driving operation. In the following, this is even more confirmed by the diagram in FIG. 4 and the associated decription.

When the vehicle is operated by means of the gas generator and gear stage III is selected, control flap 13 is in the open position, shown in broken lines, the supply of gas to free turbines $T_I$, $T_{II}$ is shut off by means of control flaps 11 and 12; brake B is again applied, while the overrunning clutches $F_I$ and $F_{II}$ are disengaged so that, in order to avoid performance losse, free turbines $T_I$ and $T_{II}$ cannot follow.

In the following, the function of a drive system according to the invention is described, with only diesel engine M in operation, FIG. 1, whereby, in this case, the diesel engine effects the slow acceleration of the vehicle with stage I of the plenetary gear, in cases where, for example, only a relatively low initial torque is required. Diesel engine M transmits its power via shaft 24 to clutch K which is engaged and thus effects a positive connection with the internal shaft 25 of the planetary gear.

In order to transmit the power of diesel engine M to output shaft S of the vehicle through gear stage I, gear shaft $18_I$ associated with stage I of the planetary gear is braked by means of brake $B_I$. Thus, also the annulus gear $20_I$ with internal and external teeth associated with gear stage I is blocked, so that planet pinions $21_I$ rolling on sun gear $14_I$ transmit the power of the diesel engine with the aid of planet gear carrier 22 to drive shaft S of the gear.

In this case, by the way, brakes $B_{II}$, $B_{III}$ of gear stages II, III associated with gear shafts $18_{II}$, $18_{III}$ are released and free turbines $T_{II}$, $T_{III}$ follow at reduced r.p.m. in a negative direction without any sizabe loss in performance.

When, for instance, during operation of the vehicle on the diesel engine in stage I of the planetary gear system, the performance of the vehicle is to be increased by using the gas generator G, the following sequence takes place. With control flap 11 in gas feed pipe 7 opened, the gas stream is routed to free turbine $T_I$ whereby, with brakes $B_I$, $B_{II}$, $B_{III}$ released and overrunning clutch $F_I$ blocked, the output of gas generator G is added to that of diesel engine M at output shaft S.

When the vehicle is driven jointly by the diesel engine and the gas turbine, upon shifting from stage I to stage II, free turbine $T_{II}$ is supplied with exhaust gas by opening control flap 12. Control flaps 11, 13 are closed, overrunning clutch $F_I$ disengages so that free turbine $T_I$ does not follow in order to avoid performance losses, whereas free turbine $T_{III}$ associated with stage III counterrotates at relatively low r.p.m. without any significant performance losses.

Shifting to stage III is then effected by opening control flap 13 and routing the gas stream to free turbine $T_{III}$ while, simultaneously, feed pipes 7, 8 are closed by control flaps 11, 12. In this case, overrunning clutches $F_I$, $F_{II}$ are released.

In addition, it should be noted, that if, for example, at 27.5 km./h., the power of the gas generator G and the diesel engine M are combined at gear stage I, the forcibly rotated free turbines $T_{II}$, $T_{III}$ are counterrotating with a considerably lower r.p.m. as compared to the gas stream driven free turbine $T_I$ and that, as performance decreases with the third power of r.p.m., the performance loss caused by the following of free turbines $T_{II}$, $T_{III}$ is negligible.

According to this invention, gear wheels $19_I$, $19_{II}$, $19_{III}$ of the planetary gear system associated with gear shafts $18_I$, $18_{II}$, $18_{III}$, which are continuously engaged with the annulus gears with internal and external teeth $20_I$, $20_{II}$, $20_{III}$ on the one hand shall, as well as said internal/external annulus gears, on the other hand, have the same diameter and number of teeth, which simplifies the manufacturing process of the transmission as well as any possible repair jobs.

To ensure that, when the power of the diesel engine and the free turbine are combined, the planetary gear associated with this invention will not stall either the diesel engine or the gas generator, this invention further features a gear ratio between free turbines $T_I$, $T_{II}$, $T_{III}$ and the annulus gears with internal and external teeth $20_I$, $20_{II}$, $20_{III}$ of the planetary gear system as well as between the individual gearwheels of planetary gear reduction stages I, II, III in such a manner that, with equal torque of each free turbine under full load and at operating speed, the torque developing at one internal/external annulus gear $20_I$ of the planetary gear system is equal to that torque which develops on said internal/external annulus gear $20_I$ under full load and at operating r.p.m. of disel engine M. This applies to equal as well as to different outputs of the two drive units (diesel engine and gas generator).

In case shaft 25 or one of gear shafts $18_I$ is braked, however, this requirement need not be met.

According to another feature of this invention, FIG. 1 shows free turbines $T_I$, $T_{II}$, $T_{III}$ arranged in a plane normal to the axis of the gas generator. Due to this arrangement, it will be possible to route the exhaust gases of each free turbine to the atmosphere in a relatively simple manner by means of the common exhaust pipe 26.

To form a diffusor, exhaust pipe 26 is provided with a restriction 27 at its outlet end. Within the zone of said restriction 27, exhaust pipe 38 of diesel engine M is connected, which, during driving by means of the diesel engine, causes a vacuum to develope in the exhaust pipe 26 of the free turbines, thus leading to an additional increase in performance of the respective free turbine to which the gas stream is routed.

The gas generator G can be started by means of the exhaust gases of the diesel engine. For this purpose, a further pipe section 29 is branched off from exhaust pipe 28, the outlet end of said exhaust pipe 29 being arranged upstream of the rotor in turbine 3. By means of a control flap 30, pipe section 29 can be opened or closed with simultaneous opening or closing of exhaust pipe 28.

FIG. 3 is a table of the different operating modes of a drive system according to this invention, the meaning of the indices in FIG. 3 being essentially identical to those in FIG. 1. For the sake of better identification, however, control flaps 11, 12, 13, and 30 have been prefixed "Kl."

The preparation of the diagrams as shown in the following FIGS. 4, 5 and 6 was based on the following data:

Output of diesel engine
Output of the gas generator driven free turbines—180 HP
$T_I$, $T_{II}$, $T_{III}$ in stages I, II, and III—180 HP each Speed of diesel engine under full load—2000 r.p.m.
Speed of free turbines $T_I$, $T_{II}$, $T_{III}$ under full load—40,000 r.p.m.
Maximum road speed of vehicle—100 km./h.

The gear ratios for the individual stages of the planetary gear system are:

For gear speed:
Stage I _____ 8.0
Stage II _____ 4.0
Stage III _____ 2.4

With a maximum torque of the diesel engine of 64.5 mkp., thus the maximum torque $Md_S$ at the output shaft S In speed:                                           Mkp.
I _____ 517
II _____ 258
III _____ 155

Figure 4:
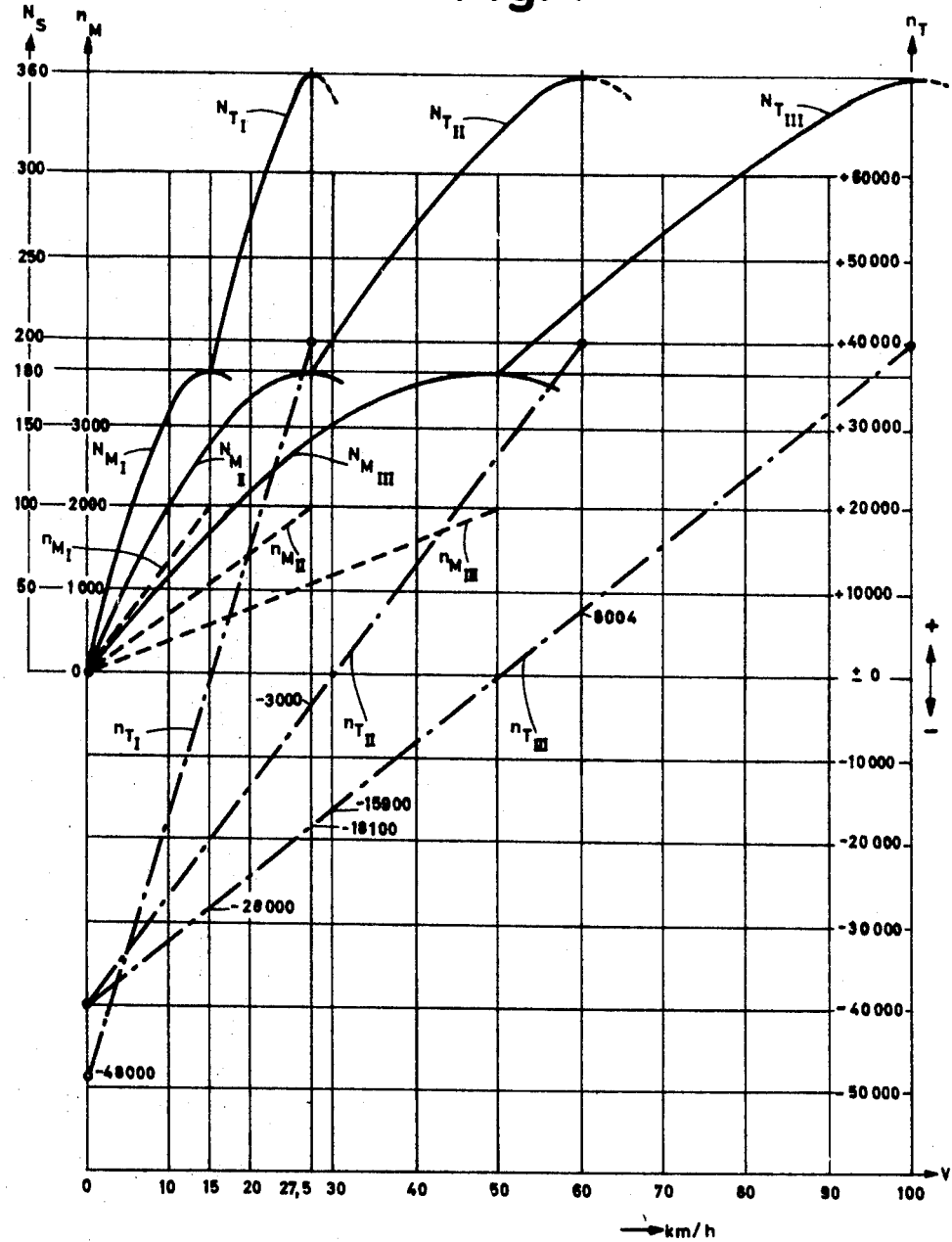
FIG. 4 is a r.p.m. and performance diagram for a vehicle driven by the diesel engine and the gas generator.

In the diagram in FIG. 4, the r.p.m. values $n_{T_I}$, $n_{T_{II}}$, $n_{T_{III}}$ of the individual free turbines are plotted from minus to plus for the various driving speeds and gear stages I to III and can be read by means of the vertical ordinate $n_T$ on the righthand side. The driving speed V for the region between 0 and 100 km./h. has been plotted on the horizontal abscissa at the bottom of the diagram.

With the aid of the vertical ordinate $N_S$ (quite to the left, starting at the 0-line), the output of both drive units can be read. Furthermore, another vertical ordinate $n_M$, arranged further towards the center of the diagram, shows the respective r.p.m.'s of the diesel engine.

From the above calculated values, the r.p.m. characteristics as shown in FIG. 4 are obtained as follows: For free turbine $T_I$ (corresponding to $n_{T_I}$ at gear stage I) for a speed range from 0 to 27.5 km./h., for free turbine $T_{II}$ (corresponding to $n_{T_{II}}$) for a speed range from 0 to 60 km./h., for free turbine $T_{III}$ (corresponding to $n_{T_{III}}$) for a speed range from 0 to 100 km./h. for a case where no overrunning clutches would exist.

The diagram shows that, when the gas supply is routed to free turbine $T_{III}$ with gear stage III of the planetary gear selected, free turbines $T_I$ and $T_{II}$ would reach considerably higher r.p.m.'s than free turbine $T_{III}$. For this reason, overrunning clutches $F_I$, $F_{II}$ have been provided on gear shafts $18_I$, $18_{II}$, which effects a standstill of free turbines $T_I$ and $T_{II}$ when free turbine $T_{III}$ is subjected to the gas stream.

Thus, overrunning clutches $F_I$, $F_{II}$ are designed in such a manner as to cause gears $19_I$, $19_{II}$ to precede gears $17_I$, $17_{II}$. Since, due to the planetary gears and the overrunning clutches $F_I$, $F_{II}$, free turbines $T_{II}$ and $T_{III}$ are positively caused to counterrotate as soon as the gas stream is routed to turbine $T_I$, it becomes necessary to analyze the values of the negative r.p.m.'s of free turbines $T_{II}$ and $T_{III}$. Thus, the r.p.m. characteristics $n_{T_I}$, $n_{T_{II}}$, $n_{T_{III}}$, show that, for example, at 27.5 km./h. in the first gear, free turbine $T_{II}$ has an r.p.m. of minus 3000 r.p.m., while free turbine $T_{III}$ rotates with minus 18,100 r.p.m. Since the performance of a turbine which is shut off from the gas stream can, even under full r.p.m., take up only ⅓ of the nominal output and as the performance changes with the third power of the r.p.m., the loss performance of free turbine $T_{III}$ would, even under the most adverse conditions, amount to 6 HP only, which is absolutely acceptable. With a speed of minus 3000 r.p.m., for free turbine $T_{II}$, the loss performance is practically zero. When free turbine $T_{II}$ is operated, free turbine $T_I$ is disengaged from gear shaft $18_I$ by means of overrunning clutch $F_I$ so that no loss performance of free turbine $T_I$ occurs. At a speed of 50 km./h. in gear stage III, turbine $T_{III}$ has a speed of 0 r.p.m., which also results in no loss performance. Due to the effect of overrunning clutches $F_I$ and $F_{II}$, also turbines $T_I$ and $T_{II}$ are static.

From the performance diagram of the two drive units, that is, the diesel engine and the gas generator, FIG. 4, top, the characteristic shape of the performance curves for various speeds ranging from 0 to 100 km./h. can be seen. The performance curve of the diesel engine for stage I is designated $N_{M_I}$, for stage II $N_{M_{II}}$ and for stage III $N_{M_{III}}$.

The performance curves resulting after adding the power of the gas generator by means of free turbines $T_I$, $T_{II}$, and $T_{III}$ for gear stages I, II, and III, respectively, are designated $N_{T_I}$, $N_{T_{II}}$ and $N_{T_{III}}$. The r.p.m. characteristics of the diesel engine in gear stages I, II, and III are designated $n_{M_I}$, $n_{M_{II}}$, and $n_{M_{III}}$.

From the diagram, FIG. 4, top, it may be seen that the diesel engine reaches its full performance already at 15 km./h. This full output at 15 km./h. is reached at a speed of 2000 r.p.m. At a driving speed of 15 km./h., free turbine $T_I$ is at standstill. Within the speed range between 15 and 27.5 km./h. in the first gear stage, the engine r.p.m. will remain constant at 2000 r.p.m. Now the gas generator is used and, by means of free turbine $T_I$ the speed of the vehicle is increased from 15 km./h. to 27.5 km./h. by driving internal/external annulus gear $20_I$ of the planetary gear stage I in the same direction of rotation as output shaft S. At 27.5 km./h., when free turbine $T_I$ has reached a speed of 40,000 r.p.m., the gas stream is routed to free turbine $T_{II}$ of stage II, whereby free turbine $T_{II}$ of stage II has a speed of minus 3000 r.p.m., while the speed of the diesel engine is again 2000 r.p.m. Thereafter, the speed of free turbine $T_{II}$ is steadily increased to 27,500 r.p.m. which corresponds to a driving speed of 50 km./h. Then, the gas stream is routed to free turbine $T_{III}$ which, at 50 km./h., has a speed of zero r.p.m., while the diesel engine operates at 2000 r.p.m. Now the speed of free turbine $T_{III}$ is increased to 40,000 r.p.m. which results in a driving speed of 100 km./h., the speed of the diesel engine still remaining constant at 2000 r.p.m. Thus the engine r.p.m. at full load remains constant at 2000 r.pm over a driving speed range from 15 to 100 km./h.

Since the torque delivered by the diesel engine at the internal shaft 25 of the gearbox in the respective stages cannot be changed by selecting the free turbine, in the case of joint operation of both drive units, the torque at output shaft S will, between 15 km./h. and 27.5 km./h. with gear stage I, correspond to the torque of the diesel engine at full load multiplied by 8.0 (=gear ratio of the first speed); in the speed range between 27.5 and 50 km./h. with gear stage II of the planetary gear the torque at output shaft S results from the torque of the diesel engine at full load multiplied by 4 (=gear ratio of the second speed), and in the speed range between 50 and 100 km./h. with gear stage III of the planetary gear, the torque at output shaft S results from the torque of the diesel engine at full load multiplied by 2.4 (=gear ratio of the third speed).

Figure 5:
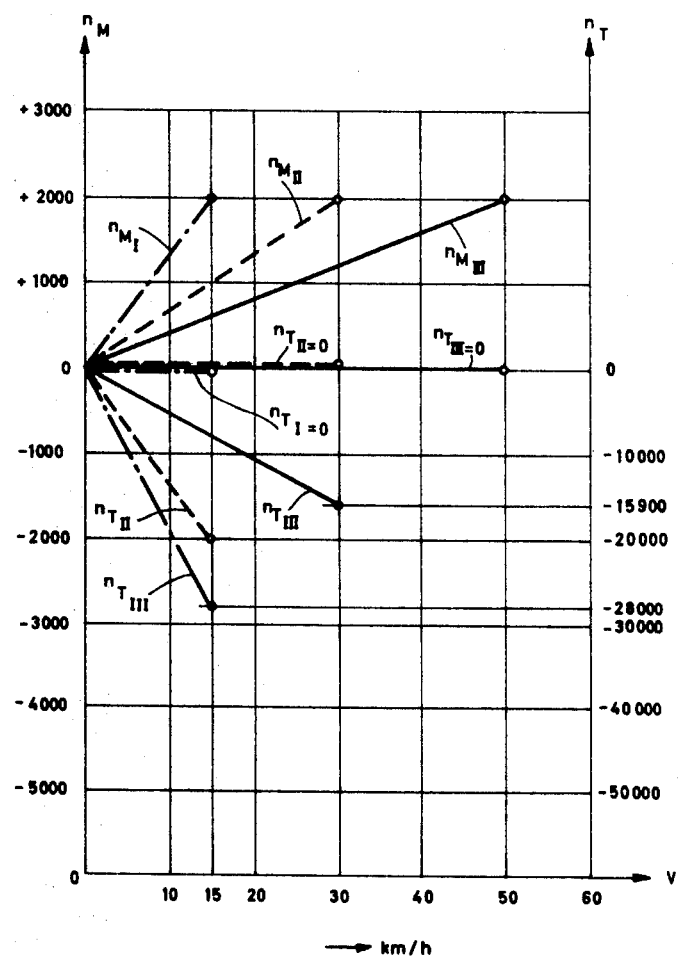
FIG. 5 is a diagram of the diesel engine and free turbine r.p.m.'s versus driving speed for the drive of the vehicle solely by means of the diesel engine for 3 speeds.

The r.p.m.'s of free turbines $T_I$, $T_{II}$, and $T_{III}$ from 0 through minus for the three stages can be seen from FIG. 5 (vertical ordinate $n_T$). The road speeds V over a range from 0 to 50 km./h. are plotted on the abscissa on the bottom.

A further vertical ordinate $n_M$ serves for reading the diesel engine r.p.m. at different road speeds achieved by means of stages I to III of the planetary gear. The r.p.m. characteristic of the diesel engine in the first stage has been designated $n_{M_I}$, in the second stage $n_{M_{II}}$ and in the third stage $n_{M_{III}}$. The r.p.m. characteristics of free turbines $T_I$, $T_{II}$, and $T_{III}$ are designated $n_{T_I}$, $n_{T_{II}}$, and $n_{T_{III}}$.

During operation in the third gear, brake $B_{III}$ of shaft $18_{III}$ is applied, thus free turbine $T_{III}$ does not rotate. Due to the overrunning clutches $F_I$, $F_{II}$ on gear shafts $18_I$, $18_{II}$, the two free turbines $T_I$, $T_{II}$ do not rotate in the third stage, thus the r.p.m.'s of free turbines $T_I$, $T_{II}$, $T_{III}=0$. In the second stage, overrunning clutch $F_I$ prevents rotation of turbine $T_I$, free turbine $T_{III}$ reaches, at a road speed of 30 km./h., a speed of minus 15,900 r.p.m. Only in the first stage, at a road speed of 15 km./h., free turbine $T_{II}$ of stage II will reach a speed of minus 20,000 r.p.m., the third stage turbine a speed of minus 28,000 r.p.m.

Nevertheless, the loss performances produced by these r.p.m. have hardly any significance for practical operation, since, in low gears, for example, while driving through a city, one would use only approximately half the speed and thus only half the engine r.p.m., whereby also the free turbine r.p.m.'s would be decreased to half their value.

Figure 6:
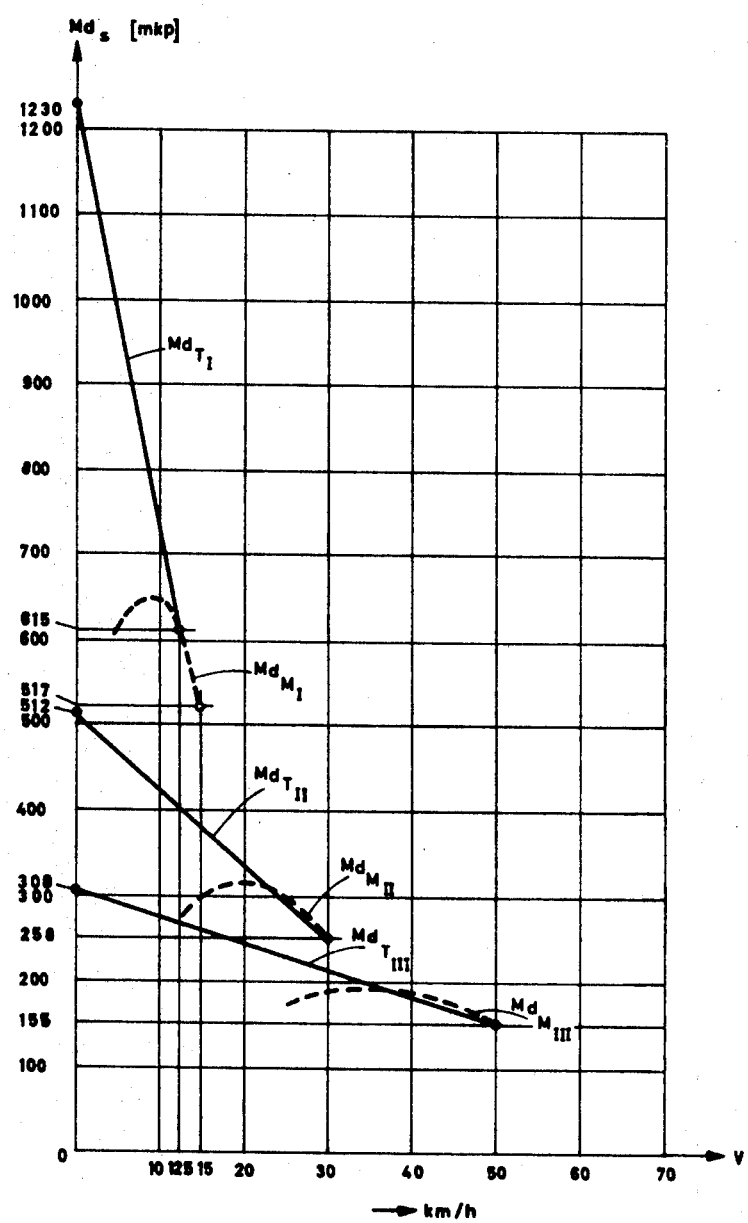
FIG. 6 is a diagram of the torques of the diesel engine and the gas generator, respectively, versus the various driving speeds.

The torque characteristics which occur on output shaft S during operation of the vehicle either by means of the diesel engine alone or by the gas generator alone in the individual stages of the planetary gear are shown in the diagram in FIG. 6. This was based on the assumption that the vehicle shall not reach a road speed in excess of 50 km./h. when operated solely either by means of the gas generator or by the diesel engine. At road speeds above 50 km./h., both diesel engine and gas generator must be operated, in which case the full load torque remains constant at 155 mkp.

The torques on output shaft S can be read on the vertical ordinate $Md_S$.

The torque characteristic for gear stage I and operating free turbine $T_I$ is designated $Md_{T_I}$, the torque characteristic for gear stage II and operating free turbine $T_{II}$ is designated $Md_{T_{II}}$ and the torque characteristic for gear stage III and operating free turbine $T_{III}$ is designated $Md_{T_{III}}$.

The torque curves for driving the vehicle solely by means of the diesel engine can also be seen from the diagram in FIG. 6. For the first gear stage they are designated $Md_{M_I}$, for the second gear stage $Md_{M_{II}}$, and for the third gear stage $Md_{M_{III}}$.

Finally, it shall be noted that the embodiment of a three-stage driving system, as shown in FIG. 1, is primarily intended for use in heavy trucks and buses. Within the scope of this invention, however, it is also contemplated to design the planetary gear system, associated with a drive unit according to this invention, as a single- or two-stage transmission, for example, for use in railroad vehicles. In this case, the reduction of the number of gear stages, as compared to the embodiment shown in FIG. 1 would also lead to a reduction of the number of the required free turbines, gear wheels, overrunning clutches, and ducts. In any case, the criterion for the number of gear stages is the torque range required, that is, the ratio between the maximum torque and the torque existing at full driving speed and under full load which, in the present example, is approximately 8, but can be kept considerably lower for railroad vehicles.

Having now described the means by which the objects of this invention are obtained,

I claim:

1. A vehicle drive system comprising a gas generator (G), a plurality of free turbines ($T_I$, $T_{II}$, $T_{III}$) joined to said generator downstream thereof for being driven thereby, a planetary gear system having a plurality of gear stages (I, II, III) selectively coupled to said free turbines, a diesel engine, an output drive shaft, and clutch means for coupling said diesel engine to said planetary gear system for jointly driving the vehicle by said gas generator and said diesel engine, or solely by said gas generator with gear shifting being made by routing the exhaust gas from said gas generator to the free turbine coupled to the respective gear stage (I, II, III).

2. A system as in claim 1, said planetary gear system including gear shafts ($18_I$, $18_{II}$, $18_{III}$), sun gears ($14_I$, $14_{II}$, $14_{III}$), and overrunning clutches ($F_I$, $F_{II}$) joined to said gear shafts, and brake means coupled to said overrunning clutches for disengaging the gear shafts associated with the higher reduction ratio stage in said planetary gear system which are not used for the output of said gas generator.

3. A system as in claim 2, further comprising gear wheels ($19_I$, $19_{II}$, $19_{III}$) joined to said gear shafts ($18_I$, $18_{II}$, $18_{III}$) continuously engaged with annular gears ($20_I$, $20_{II}$, $20_{III}$) having internal and external teeth and having the same number of teeth and diameters in the planetary gear system.

4. A system as in claim 3, the gear ratio between the free turbines ($T_I$, $T_{II}$, $T_{III}$) and the annular gears ($20_I$, $20_{II}$, $20_{III}$) and the individual gears of gear stages (I, II, III) being such that with equal torque of each free turbine under full load and operating speed, the torque developed at an annular gear ($20_I$) is equal to the torque developed on annular gears ($20_I$, $20_{II}$, $20_{III}$) by said diesel engine (M) when running at full load and r.p.m.

5. A system as in claim 4, said free turbines being positioned in a plane normal to the longitudinal axis of said gas generator.

6. A system as in claim 5, said gas generator being joined to said free turbines by gas pipes (7, 8, 9), and valve control flaps (11, 12, 13) being mounted in said pipes for routing generator exhaust gases to said free turbines.

7. A system as in claim 6, further comprising means for starting said gas generator (G) by the exhaust gas from the diesel engine (M).

8. A system as in claim 7, further comprising a free turbine exhaust pipe (26) having a diffusor (27), and pipe means (28) for discharging the diesel engine exhaust gas through said diffusor.

References Cited

UNITED STATES PATENTS

| | | | |
|---|---|---|---|
| 2,411,227 | 11/1946 | Planiol et al. | 60—11 |
| 2,561,090 | 7/1951 | Baumann | 60—11 |

MARTIN P. SCHWADRON, Primary Examiner

R. BUNEVICH, Assistant Examiner

U.S. Cl. X.R.

74—675